United States Patent
Esfahani et al.

(10) Patent No.: US 10,499,242 B1
(45) Date of Patent: Dec. 3, 2019

(54) METHOD AND APPARATUSES FOR DATA INTEGRITY AND SECURITY FOR COMMUNICATIONS IN SMART POWER SYSTEMS

(71) Applicants: Mohammad Mahmoudian Esfahani, Miami, FL (US); Tarek Youssef, Pensacola, FL (US); Osama Mohammed, Miami, FL (US)

(72) Inventors: Mohammad Mahmoudian Esfahani, Miami, FL (US); Tarek Youssef, Pensacola, FL (US); Osama Mohammed, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

(21) Appl. No.: 16/422,461

(22) Filed: May 24, 2019

(51) Int. Cl.
| | |
|---|---|
| H04W 12/00 | (2009.01) |
| H04W 40/02 | (2009.01) |
| G06F 7/58 | (2006.01) |
| H04W 84/12 | (2009.01) |

(52) U.S. Cl.
CPC .......... *H04W 12/001* (2019.01); *G06F 7/588* (2013.01); *H04W 40/02* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 7,630,863 B2* | 12/2009 | Zweigle | ............. | G01R 19/2513 |
| | | | | 702/177 |
| 2002/0038426 A1* | 3/2002 | Pettersson | ............... | G06F 21/32 |
| | | | | 713/186 |
| 2003/0026223 A1* | 2/2003 | Eriksson | .............. | H04B 1/7143 |
| | | | | 370/335 |
| 2003/0053625 A1* | 3/2003 | Bially | ................... | H04L 9/0631 |
| | | | | 380/42 |
| 2006/0269063 A1* | 11/2006 | Hauge | ..................... | G06F 21/10 |
| | | | | 380/262 |
| 2008/0091944 A1* | 4/2008 | von Mueller | ........ | G06Q 20/085 |
| | | | | 713/168 |
| 2009/0254655 A1* | 10/2009 | Kidwell | .............. | H04L 41/0226 |
| | | | | 709/224 |
| 2014/0282021 A1* | 9/2014 | Dolezilek | ............... | H04L 41/22 |
| | | | | 715/735 |

* cited by examiner

*Primary Examiner* — Henry Tsang
(74) *Attorney, Agent, or Firm* — Saliwanchik, Lloyd & Eisenschenk

(57) ABSTRACT

Methods and apparatuses for ensuring data integrity and security for communications over a wide area network in smart power systems are provided. These can be particularly helpful in sub station-to-sub station and sub station-to-control-center communications, for example when a fast and secure method is required to transfer critical messages over the network such as generic object oriented substation event messages. In addition to guaranteeing data integrity, methods and apparatuses provide reliable security algorithms based on the concept of sequence hopping.

20 Claims, 4 Drawing Sheets

METHOD AND APPARATUSES FOR DATA INTEGRITY AND SECURITY FOR COMMUNICATIONS IN SMART POWER SYSTEMS

BACKGROUND

Modern power system automation and smart grids rely on communication for various reasons, including critical infrastructure protection and power routing. Communication between substation devices, namely intelligent electronic devices (IEDs), is integral for substations to keep up with their real-time operations. IEDs are embedded microcontroller systems that support Ethernet-based communication and perform several protective and control functions in a substation automation system (SAS), such as data and file transfer. Unfortunately, whenever data are transferred, there is an opportunity for the data to be intercepted or corrupted. In addition, data can be sent from or intercepted by malicious and unauthorized sources, potentially causing catastrophic consequences.

Industry has established data security protocols in an attempt to avoid the intrusion of malicious and unauthorized sources. However, these protocols often require intensive processing power for which existing, and even some modern IEDs, are not equipped to handle. Adding to the problem, some of the critical data sent between IEDs needs to be transmitted quickly, limiting the amount of encryption/decryption time and further increasing the processing requirements of IEDs. This combination of IEDs lack of processing power and the need for critical information to be relayed quickly has resulted in critical data being transmitted unprotected, leaving an opening for unauthorized and potentially malicious users to cause harm within the system.

BRIEF SUMMARY

Embodiments of the subject invention provide methods and apparatuses for ensuring data integrity and security for communications (e.g., routable communications) over a wide area network (WAN) in smart power systems (e.g., power-system automation and smart grids). Embodiments of the subject invention can be particularly helpful in substation-to-substation (SS2SS) and substation-to-control-center (SS2CC) communications, for example when a fast and secure method is required to transfer critical messages over the network such as generic object oriented substation event (GOOSE) messages (e.g., routable GOOSE (R-GOOSE) messages). In addition to guaranteeing data integrity, embodiments also provide reliable security algorithms based on the concept of sequence hopping, which can be referred to as secure sequence hopping algorithm (SSHA).

In an embodiment, a method of securing data transfer over a WAN in a smart power system can comprise: providing a seed generator server (SGS); providing a publisher intelligent electronic device (IED) having a first random number generator (RNG) and being in operable communication with the SGS; providing a subscriber IED having a second RNG and being in operable communication with the SGS; generating, by the SGS, a random seed number and transferring the random seed number to the publisher IED and the subscriber IED using an encrypted channel; synchronizing the first RNG and the second RNG using the encrypted channel; generating a publisher sequence hopping number, by the first RNG, based on the random seed number; generating a publisher encryption random number (key), by the first RNG, based on the random seed number; generating a subscriber sequence hopping number, by the second RNG, based on the random seed number; generating a subscriber decryption random number (key), by the second RNG, based on the random seed number; attaching, by the publisher IED, the publisher sequence hopping number to a message to be routed through the WAN; publishing, by the publisher IED, the message to a local area network (LAN) of a first substation with which the publisher IED is in operable communication (or is a part of); signing, by a server in the first substation, the message with the publisher encryption random number; transferring the message from the server in the first substation through a communication channel (which can be different from the encryption channel) and routing the message to a second substation with which the subscriber IED is in operable communication (or is a part of); receiving, by a server in the second substation, the message; performing the following steps a) through e) to verify the message: a) decrypting, by the server in the second substation, the message using the subscriber decryption random number; b) if the decryption is successful, publishing the received message to a LAN of the second substation; c) comparing, by the subscriber IED, the publisher sequence hopping number attached to the received message to the subscriber sequence hopping number; d) accepting, by the subscriber IED, the received message if the publisher sequence hopping number is the same as the subscriber sequence hopping number, and reacting to the received message accordingly; and e) discarding, by the subscriber IED, the received message if the publisher sequence hopping number is not the same as the subscriber sequence hopping number, such that the subscriber IED does not react to the received message. The message can be a GOOSE message, such as an R-GOOSE message. The encrypted channel can be a secure socket layer (SSL) channel. The generating of the publisher sequence hopping number, by the first RNG, can be done using a first pseudo RNG (PRNG) algorithm, the generating of the publisher encryption random number (key), by the first RNG, can be done using the first PRNG algorithm, the generating of the subscriber sequence hopping number, by the second RNG, can be done using a second PRNG algorithm, and the generating of the subscriber decryption random number (key), by the second RNG, can be done using the second PRNG algorithm. The signing of the message with the publisher encryption random number can be done using a symmetric lightweight encryption algorithm (e.g., XOR algorithm). The SGS can periodically change the random seed number at a regular interval such that there is a predetermined amount of time between each change of the random seed number, and the predetermined amount of time can be in a range of, for example, from 3 milliseconds (ms) to 8 weeks.

Because missing samples are probable in communications over the network, and to ensure the SSHA continues working even if some samples are missing and that an interruption is not caused, if the subscriber IED (and/or server in the second substation) cannot decrypt the received message, it can assume that the sample has been missed in the network and can generate the next pair of random numbers and try to decrypt and verify the received message. This can be continued for several sequences (e.g., 5 to 10 sequences). If it still cannot decrypt the message, a signal can be sent (e.g., by the subscriber IED and/or the server in the second substation) to an operator of the system to report the problem of the communication link between publisher and subscriber and another signal can be sent to the SGS (by the subscriber IED, the server in the second substation, and/or the operator) to request that it generates another random seed number.

In another embodiment, a method of securing data transfer over a WAN in a smart power system using a data distribution service (DDS) can comprise: providing a seed generator server (SGS); providing a first substation comprising a publisher intelligent electronic device (IED) having a first random number generator (RNG) and being in operable communication with the SGS; providing a second substation comprising a subscriber IED having a second RNG and being in operable communication with the SGS; creating a secure channel for synchronized seed distribution by using a local shared certificate authority and permission certificate authority, along with a public key and a private key, for each of the first substation and the second substation; generating, by the SGS, a random seed number and transferring the random seed number to the publisher TED and the subscriber TED using the secure channel; synchronizing the first RNG and the second RNG using the secure channel; generating a publisher sequence hopping number, by the first RNG, based on the random seed number; generating a publisher encryption random number, by the first RNG, based on the random seed number; generating a subscriber sequence hopping number, by the second RNG, based on the random seed number; generating a subscriber decryption random number (key), by the second RNG, based on the random seed number; attaching, by the publisher TED, the publisher sequence hopping number to a generic object oriented substation event (GOOSE) message to be routed through the WAN; publishing, by the publisher TED, the GOOSE message to a LAN of the first substation; subscribing, by a server in the first substation, the GOOSE message with the attached publisher sequence hopping number; signing, by the server in the first substation, the GOOSE message with the publisher encryption random number (key); converting, by the server in the first substation, the GOOSE message to a DDS message; publishing, by the server in the first substation, the DDS message to a predefined topic in the LAN of the first substation; routing, by a DDS routing service, the DDS message over the WAN to the second substation; performing the following steps a) through e) to verify the DDS message: a) decrypting, by a server in the second substation, the received DDS message using the subscriber decryption random number (key); b) if the decryption is successful, converting, by the server in the second substation, the received DDS message to a received GOOSE message and publishing the received GOOSE message in the LAN such that it is received by the subscriber TED; c) comparing, by the subscriber TED, the publisher sequence hopping number to the subscriber sequence hopping number attached to the received GOOSE message; d) accepting, by the subscriber TED, the received GOOSE message if the publisher sequence hopping number is the same as the subscriber sequence hopping number, and reacting to the received GOOSE message accordingly; and e) discarding, by the subscriber TED, the received GOOSE message if the publisher sequence hopping number is not the same as the subscriber sequence hopping number, such that the subscriber IED does not react to the received GOOSE message.

If the subscriber IED (and/or server in the second substation) cannot decrypt the received GOOSE message, it can assume that the sample has been missed in the network and can generate the next pair of random numbers and try to decrypt and verify the received message. This can be continued for several sequences (e.g., 5 to 10 sequences). If it still cannot decrypt the message, a signal can be sent (e.g., by the subscriber IED and/or the server in the second substation) to an operator of the system to report the problem of the communication link between publisher and subscriber and another signal can be sent to the SGS (by the subscriber IED, the server in the second substation, and/or the operator) to request that it generates another random seed number.

DETAILED DESCRIPTION

Embodiments of the subject invention provide methods and apparatuses for ensuring data integrity and security for communications (e.g., routable communications) over a wide area network (WAN) in smart power systems (e.g., power-system automation and smart grids). Embodiments of the subject invention can be particularly helpful in substation-to-substation (SS2SS) and substation-to-control-center (SS2CC) communications, for example when a fast and secure method is required to transfer critical messages over the network such as generic object oriented substation event (GOOSE) messages (e.g., routable GOOSE (R-GOOSE) messages). In addition to guaranteeing data integrity, embodiments also provide reliable security algorithms based on the concept of sequence hopping, which can be referred to as secure sequence hopping algorithm (SSHA).

Although the primary use of International Electrotechnical Commission (IEC) 61850 GOOSE messaging has been for critical event driven communications inside a substation, the IEC 61850 standard is being extended to cover SS2SS communication (IEC 61850-90-1) over a WAN in the layer 3 (network layer) of an open systems interconnection (OSI) model. This requires a different network architecture and will therefore introduce a new surface of attack on GOOSE messages including man-in-the-middle attacks.

Figure 1:
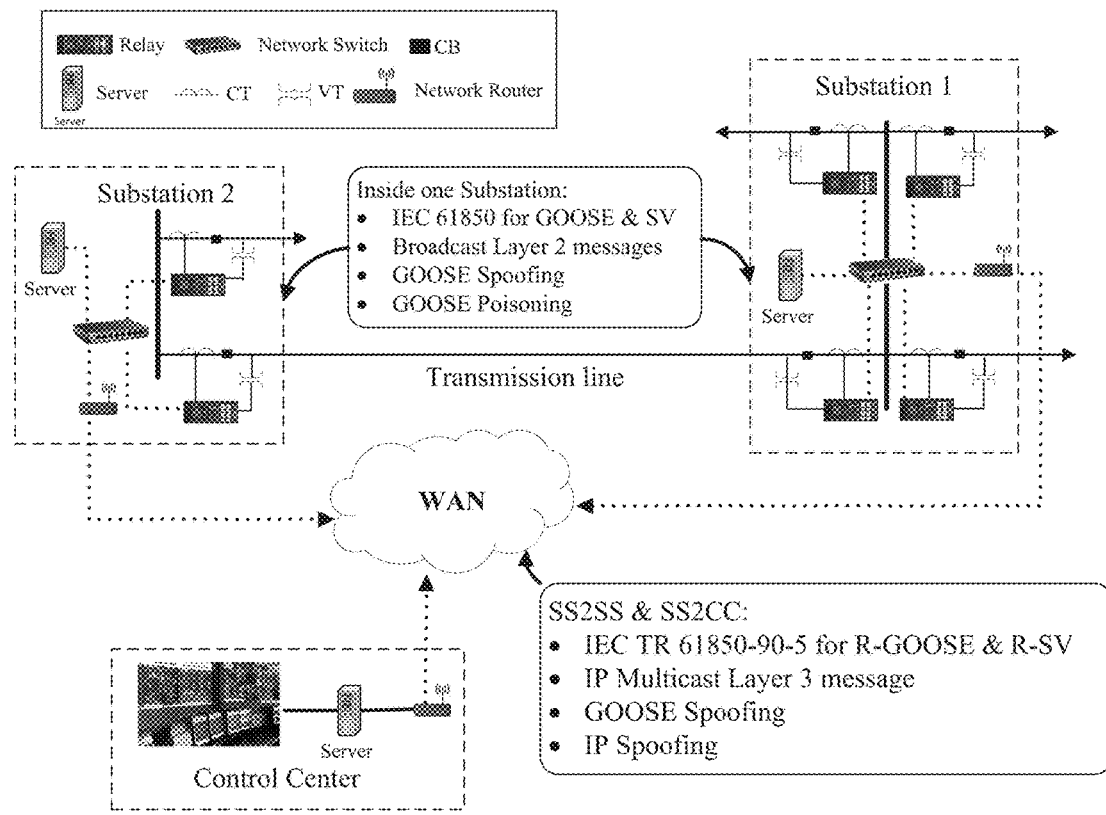
FIG. 1 is a schematic view showing a communication framework for substation-to-substation (SS2SS) communication and substation-to-control-center (SS2CC) communication over a wide area network (WAN).

FIG. 1 is a schematic view showing a communication framework for SS2SS communication and SS2CC communication over a WAN. Referring to FIG. 1, moving beyond the walls of a single substation, GOOSE messages are being utilized to establish SS2SS and SS2CC communication. Such applications include distance line protection, interlocking, and teleprotection. For new applications, a new network architecture can be used, which includes the transmission of IEC 61850 GOOSE messages not only on the data level (Layer 2 of the OSI model), but also on the application level (Layer 3). That is, methods to route GOOSE messages over local area networks (LANs) require techniques such as tunneling (generic route encapsulation (GRE) or Layer 2 tunneling) or encapsulation. This will introduce a new surface of attack including address resolution protocol (ARP) spoofing and other man-in-the-middle attacks. The time delay for the R-GOOSE messaging over the WAN is 10 milliseconds (ms).

Advantageously, embodiments of the subject invention can cover the security of new applications of IEC 61850 GOOSE messaging for communication over the WAN. Data integrity can be provided through lightweight authentication and key management to provide a fast and reliable security mechanism.

The IEC Technical Report (TR) 61850-90-5:2012, which is hereby incorporated herein by reference in its entirety, provides communication protocol for R-GOOSE along with a cyber-security protocol over WAN. The IEC TR 61850-90-5 security mechanism for R-GOOSE has the following options: 1) none; 2) signature (i.e., authentication); and 3) signature and encryption. IEC TR 61850-90-5 security specifies the use of a signature using symmetric keys being applied to create a secure hashed message authentication code (HMAC). The application messages are carried over an IEC TR 61850-90-5 session layer, which provides security and management via the 90-5 specific group domain of interpretation (GDOI) protocol. GDOI support for 61850 protocols is described in the updated revision of IEC 62351-9, and the key exchanges use GDOI (RFC 6407—GDOI). However, message signing and verification cannot meet the 10 ms time limit for R-GOOSE on i7 processors, let alone lower-rated intelligent electronic devices (LEDs).

Broadcasting a GOOSE message over the WAN can be done using, for example, techniques such as tunneling (GRE or Layer 2 tunneling) or encapsulation (multiprotocol label switching (MPLS), pseudo wire or virtual private LAN) to route GOOSE messages between publishers and subscribers in different substations or between one or more substations and the control center. The network infrastructure and prioritization should provide a fast delivery within the allowed latency for this purpose (e.g., 10 ms or less).

Figure 2:
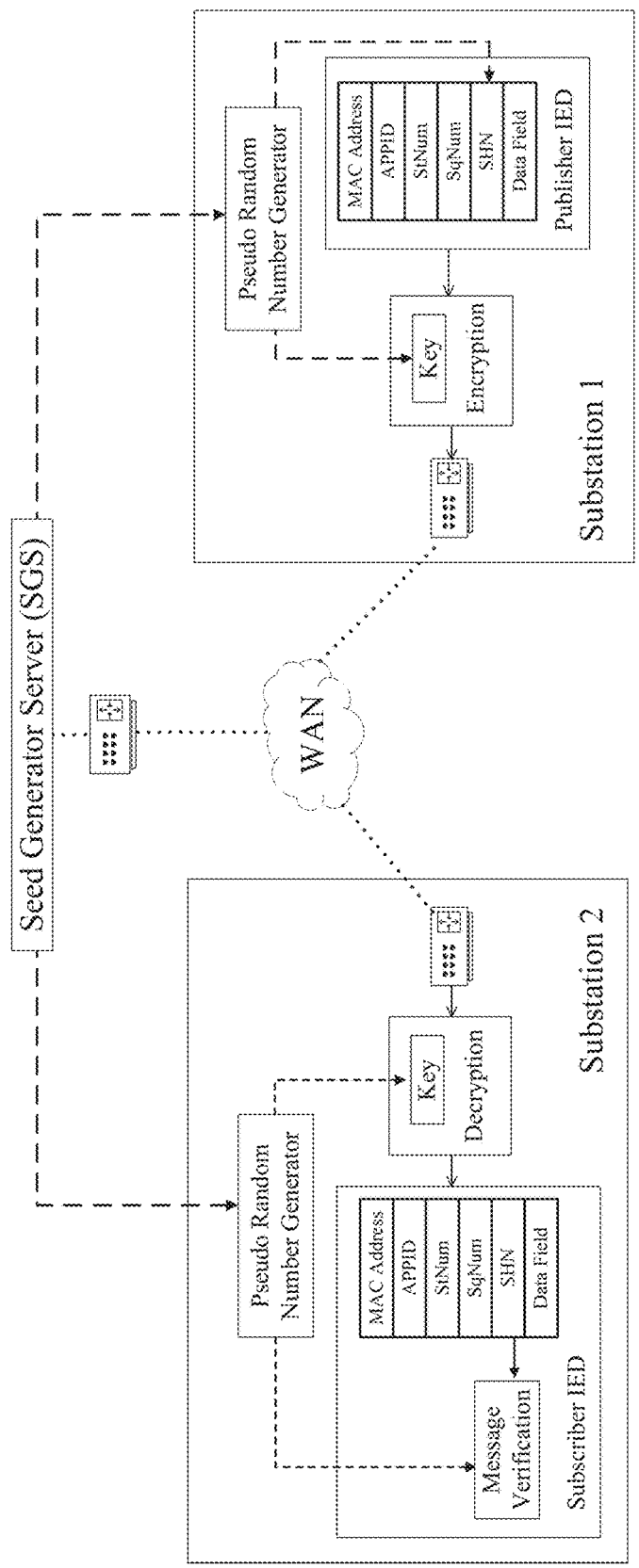
FIG. 2 is a schematic view showing a secure sequence hopping algorithm (SSHA) for routable generic object oriented substation event (R-GOOSE) communication, according to an embodiment of the subject invention.

FIG. 2 shows a SSHA for R-GOOSE communication, according to an embodiment of the subject invention. The SSHA provides data integrity and security when messages are broadcasted into the WAN. Referring to FIG. 2, two communication channels are required. The first communication channel is an encrypted connection (e.g., a secure socket layer (SSL) channel), which is used by a seed generator server (SGS) to communicate with both participants through an encrypted channel to exchange random seed numbers and to synchronize random number generators (RNGs) between publisher and subscriber. This seed can be used by pseudo RNGs (PRNGs) to produce two unique random numbers for each message. The first unique random number can be attached to the message (sequence hopping number) to prevent or inhibit replay attack; and the second random number can be used to sign the message through a light symmetric encryption algorithm to ensure data integrity.

Then, the message can be transferred through the second communication channel and routed through the network to find its destination. Because the receiver has the same seed random number, it will produce the two same random numbers (random numbers that are used by the publisher), once it receives a new message. Therefore, if the message is not manipulated, the decryption algorithm quickly finds the content of the message by using its second random (key) number to decrypt the message. The process continues by checking the first random number of the receiver with a sequence hopping number attached with the GOOSE message. If the decryption is successful and the sequence hopping number is the same, the message is verified and the subscriber reacts to it; otherwise, it is rejected. In certain embodiments, the SGS can change the seed number periodically. Depending on the security level of the application, the period of time between when the SGS changes the seed number can be in a range of, for example, a few ms to a few weeks or more (or any amount of time in between), with a shorter period of time being used for a higher security level.

In an embodiment, a data distribution service (DDS) can be used as a standard for a publish/subscribe message. Because the communication is done over the WAN, the DDS routing service can be deployed to distribute a GOOSE message over the network through the DDS. The DDS is based on the real-time publish-subscribe protocol, so it is expected to have a very low time latency when this technology is used for communication between substations (SS2SS) or between one or more substations and the control center (SS2CC). Because of the great speed with which GOOSE messages are transferred over the network, more time will be available for the encryption/decryption process. Using the security mechanism for DDS, an encrypted channel can be created for communication between the SGS and publisher/subscribers in two different substations.

Figure 3:
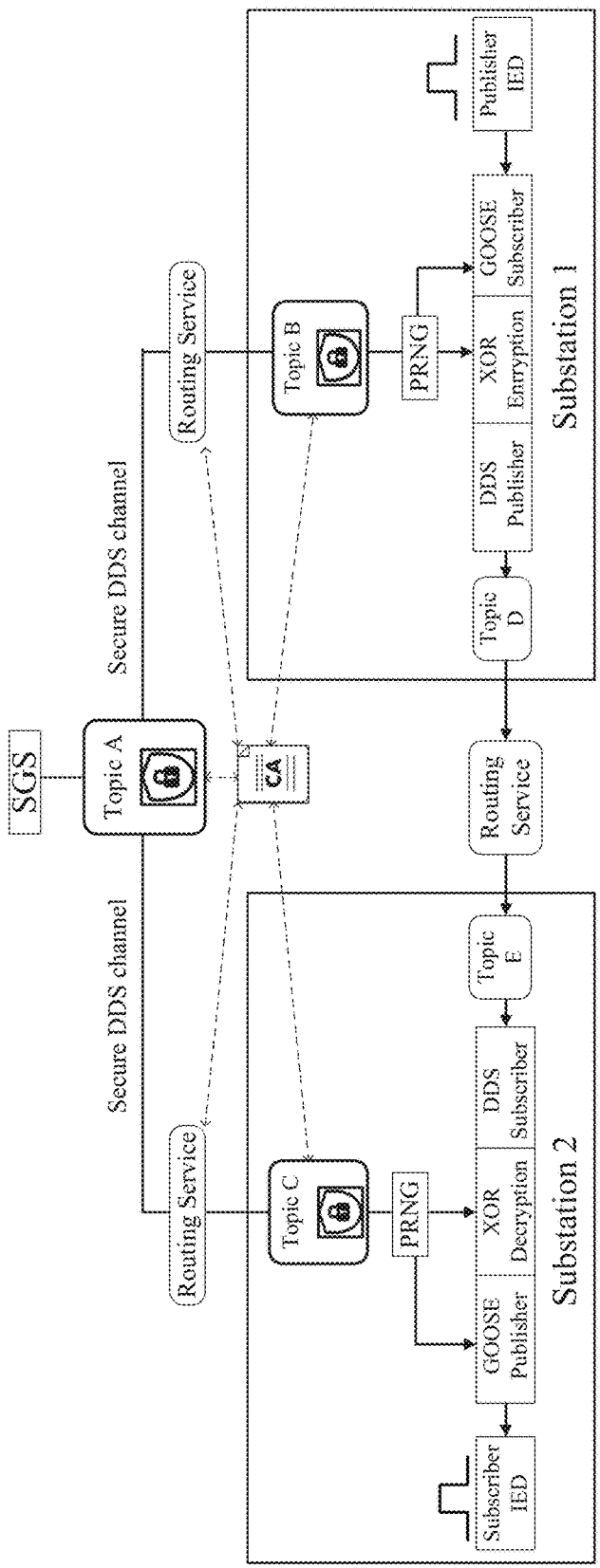
FIG. 3 is a schematic view showing a data distribution service (DDS)-based communication framework for a SSHA, according to an embodiment of the subject invention.

FIG. 3 is a schematic view showing a DDS-based communication framework for a SSHA, according to an embodiment of the subject invention. Referring to FIG. 3, the DDS can be used to implement transfer of GOOSE messages between two substations in different networks and an encrypted channel for synchronizing the seeds for all PRNGs. The following steps can be performed to implement the DDS-based communication framework for a SSHA.

1) Create a secure channel for synchronized seed distribution among participants. This secure channel is possible by using an asymmetric encryption algorithm. A local shared certificate authority (CA) and permission certificate authority, along with public and private keys for each participant, are needed to develop a fast and secure channel while controlling the access of participants to data by setting a permission access to the framework. This permission access defines which participant(s) can publish or subscribe to which topic in the system.

2) Sign and transfer the GOOSE message from layer 2 of the OSI model in substation 1 to the network layer and broadcast it to the WAN, followed by receiving and decrypting the message, checking the validity and data integrity, and publishing it to the LAN of the second substation where the subscriber IED is waiting for the message. As shown in FIG. 3, this section can include the following sub-steps a)-d).

a) The first sub-step can be to create a GOOSE message, for example, a regular pulse between participants or a trip/blocking signal from the IED, and add the first random number (generated by the PRNG) to it as sequence hopping number.

b) To be able to use the DDS, the GOOSE message needs to be converted to a DDS message, and this can be done as follows in i)-iv).

i) Subscribe the GOOSE message.

ii) Sign the message using the second random number generated by the PRNG using a light encryption algorithm (e.g., XOR with very low latency).

iii) Convert the encrypted message to the DDS message.

iv) Publish the DDS message to a pre-defined topic in the LAN at substation 1.

c) By receiving the DDS message, the DDS Routing service can be deployed to route the message to its destination over the WAN.

d) The DDS subscriber can receive the message in the LAN at substation 2 and go through the following steps i)-iv).
   i) Use the second random number generated by the PRNG in substation 2 to decrypt and read the message.
   ii) Convert the received message to a GOOSE message and publish it in its local network.
   iii) The subscribed IED will receive the message, and compare its sequence hopping number with the first random number generated by its PRNG.
   iv) If the message is verified, the subscriber IED reacts to it; otherwise, it is rejected.

In the DDS framework, a GOOSE message is sent at the sender side and the GOOSE message is delivered to the receiver. In between, two conversions from GOOSE→DDS and DDS→GOOSE occur to route the GOOSE message over the network.

Embodiments of the subject invention provide SSHAs that ensure data integrity and security for routable communications over the WAN in smart power systems. The algorithms can be implemented for SS2SS and/or SS2CC communications when a fast and secure method is required to transfer critical messages over the network, such as GOOSE messages. The security algorithms guarantee data integrity based on the concept of sequence hopping. The SSHAs can be implemented for SS2SS and/or SS2CC over the WAN for any suitable application, such as distance line protection, interlocking, and teleprotection. The security of power systems, especially in teleprotection, is critical. Any cyber attack to the system can cause major problems, such as mandatory load shedding, partial system blackout, or whole system blackout. Because the next generation of teleprotection would be over the WAN, and the message transferring time for routable communication is limited to 10 ms, fast and reliable security algorithms, such as those of embodiments of the subject invention, are required for optimal power system cyber security, especially for the next generation of protection devices and IEDs.

Related art encryption technologies (message signing and verification) cannot meet the 10 ms time limit for R-GOOSE on i7 processors, let alone lower-rated IEDs. The SSHAs of embodiments of the subject invention advantageously meet this time limit by using light and fast encryption algorithms in combination with sequence hopping security algorithms to provide two security layers for R-GOOSE messages over the network. SSHAs of embodiments of the subject invention can provide fast and reliable security schemes for routable communication in power systems to ensure data integrity and prevent or inhibit replay attacks due to transferring messages.

Figure 4:
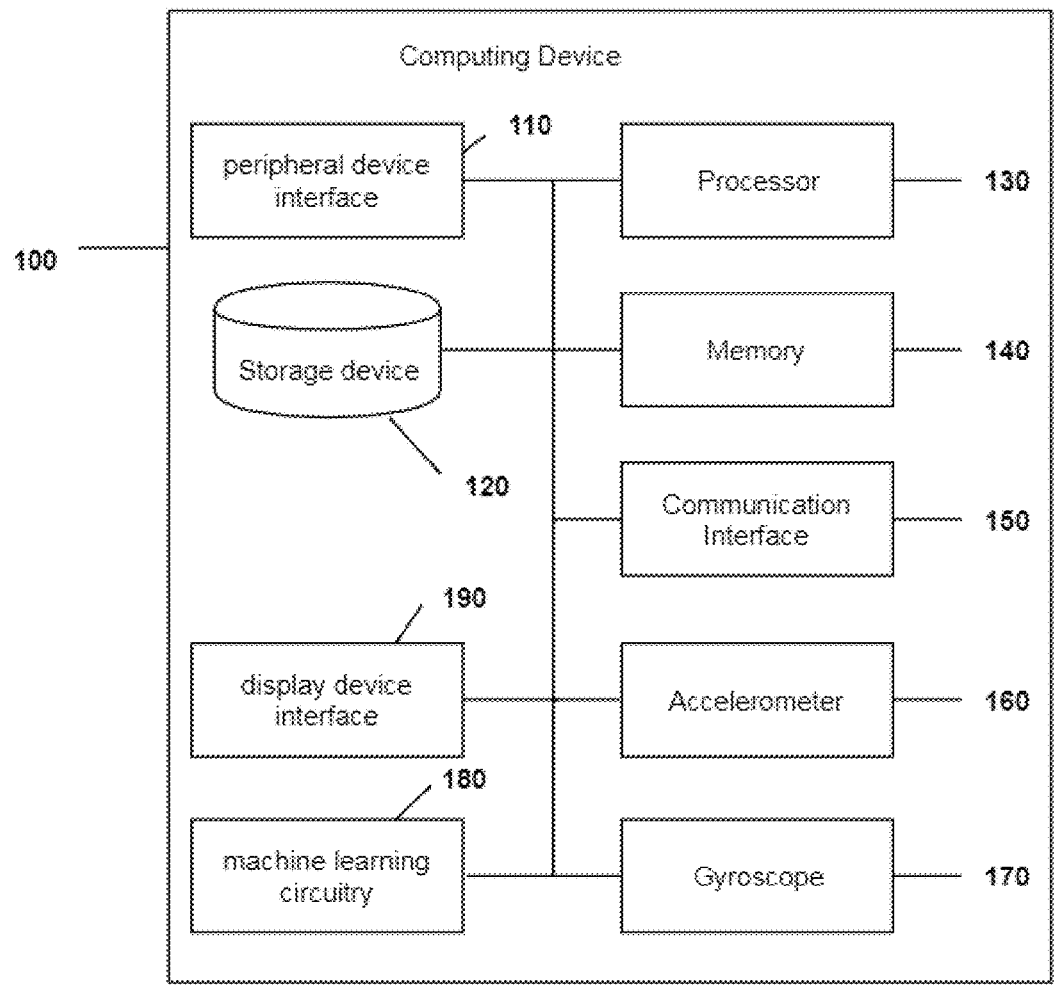
FIG. 4 shows a block diagram of a computing device according to an embodiment of the subject invention.

FIG. 4 shows a computing device 100 that can be used to implement features described herein. The computing device 100 can include one or more of a peripheral device interface 110, a storage device 120 a processor 130, a memory device 140, a communication interface 150, an accelerometer 160, a gyroscope 170, machine learning circuitry 180, and a display device interface 190. The processor 130 is required, but all other elements (110, 120, 140, 150, 160, 170, 180, and 190) are optional. The storage device 120 will typically be present and can include, for example a (non-transitory) machine-readable medium (e.g., a (non-transitory) computer-readable medium.

The memory device 140, including the cache, may be or include a device such as a Dynamic Random Access Memory (D-RAM), Static RAM (S-RAM), or other RAM or a flash memory. The storage device 120 may be or include a hard disk, a magneto-optical medium, an optical medium such as a CD-ROM, a digital versatile disk (DVDs), or BLU-RAY disc (BD), or other type of device for electronic data storage.

The communication interface 150 may be, for example, a communications port, a wired transceiver, a wireless transceiver, and/or a network card. The communication interface 150 can be capable of communicating using technologies such as Ethernet, fiber optics, microwave, xDSL (Digital Subscriber Line), Wireless Local Area Network (WLAN) technology, wireless cellular technology, BLUETOOTH technology and/or any other appropriate technology.

The peripheral device interface 110 may be an interface configured to communicate with one or more peripheral devices. The peripheral device interface 110 may operate using a technology such as Universal Serial Bus (USB), PS/2, BLUETOOTH, infrared, serial port, parallel port, and/or other appropriate technology. The peripheral device interface 110 may, for example, receive input data from an input device such as a keyboard, a mouse, a trackball, a touch screen, a touch pad, a stylus pad, and/or other device.

The display device interface 180 may be an interface configured to communicate data to a display. The display device interface 180 may operate using technology such as Video Graphics Array (VGA), Super VGA (S-VGA), Digital Visual Interface (DVI), High-Definition Multimedia Interface (HDMI), or other appropriate technology.

An embodiment of the computing device 100 can be configured to perform any feature or any combination of features described above as performed by the user device 130. The memory device 140 and/or the storage device 120 can comprise stored instructions that when executed cause at least one processor 130 to perform any feature or any combination of features described herein.

Although FIG. 4 shows that the computing device 100 includes a single processor 130, single memory device 140, single communication interface 150, single peripheral device interface 110, single display device interface 180, and single storage device 120, the computing device may include multiples of each or any combination of these components, and may be configured to perform analogous functionality to that described herein.

The methods and processes described herein can be embodied as code and/or data. The software code and data described herein can be stored on one or more machine-readable media (e.g., computer-readable media), which may include any device or medium that can store code and/or data for use by a computer system. When a computer system and/or processor reads and executes the code and/or data stored on a computer-readable medium, the computer system and/or processor performs the methods and processes embodied as data structures and code stored within the computer-readable storage medium.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that are capable of storing computer-readable information/data. Computer-readable media should not be construed or interpreted to include any propagating signals. A computer-readable medium of the subject invention can be, for example, a compact disc (CD), digital video disc (DVD), flash memory device, volatile memory, or a hard disk drive (HDD), such as an external HDD or the HDD of a computing device, though embodiments are not limited thereto. A computing device can be, for example, a laptop computer, desktop computer, server, cell phone, or tablet, though embodiments are not limited thereto.

It should be understood that the examples and embodiments described herein are for illustrative purposes only and that various modifications or changes in light thereof will be suggested to persons skilled in the art and are to be included within the spirit and purview of this application.

All patents, patent applications, provisional applications, and publications referred to or cited herein are incorporated by reference in their entirety, including all figures and tables, to the extent they are not inconsistent with the explicit teachings of this specification.

What is claimed is:

1. A method of securing data transfer over a wide area network (WAN) in a smart power system, the method comprising:
   providing a seed generator server (SGS);
   providing a publisher intelligent electronic device (IED) having a first random number generator (RNG) and being in operable communication with the SGS;
   providing a subscriber IED having a second RNG and being in operable communication with the SGS;
   generating, by the SGS, a random seed number and transferring the random seed number to the publisher IED and the subscriber IED using an encrypted channel;
   synchronizing the first RNG and the second RNG using the encrypted channel;
   generating a publisher sequence hopping number, by the first RNG, based on the random seed number;
   generating a publisher encryption random number, by the first RNG, based on the random seed number;
   generating a subscriber sequence hopping number, by the second RNG, based on the random seed number;
   generating a subscriber decryption random number, by the second RNG, based on the random seed number;
   attaching, by the publisher IED, the publisher sequence hopping number to a message to be routed through the WAN;
   publishing, by the publisher IED, the message to a local area network (LAN) of a first substation with which the publisher IED is in operable communication;
   signing, by a server in the first substation, the message with the publisher encryption random number;
   transferring the message from the server in the first substation through a communication channel and routing the message to a second substation with which the subscriber IED is in operable communication;
   receiving, by a server in the second substation, the message; and
   performing the following steps a) through e) to verify the message:
   a) decrypting, by the server in the second substation, the message using the subscriber decryption random number;
   b) if the decryption is successful, publishing the received message to a LAN of the second substation;
   c) comparing, by the subscriber IED, the subscriber sequence hopping number to the publisher sequence hopping number attached to the received message;
   d) accepting, by the subscriber IED, the received message if the publisher sequence hopping number is the same as the subscriber sequence hopping number, and reacting to the received message accordingly; and
   e) discarding, by the subscriber IED, the received message if the publisher sequence hopping number is not the same as the subscriber sequence hopping number, such that the subscriber IED does not react to the received message.

2. The method according to claim 1, the message being a generic object oriented substation event (GOOSE) message.

3. The method according to claim 2, the message being a routable GOOSE (R-GOOSE) message.

4. The method according to claim 1, the encrypted channel being a secure socket layer (SSL) channel.

5. The method according to claim 1, the generating of the publisher sequence hopping number, by the first RNG, being done using a first pseudo RNG (PRNG) algorithm,
   the generating of the publisher encryption random number, by the first RNG, being done using the first PRNG algorithm,
   the generating of the subscriber sequence hopping number, by the second RNG, being done using a second PRNG algorithm, and
   the generating of the subscriber decryption random number, by the second RNG, being done using the second PRNG algorithm.

6. The method according to claim 1, where, if the decryption is unsuccessful in step b), the subscriber IED generates a next pair of random numbers and the decryption is tried again and, if decryption is still unsuccessful after a plurality of such additional decryption attempts, a signal is sent to the SGS to request that it generates a new random seed number.

7. The method according to claim 1, the signing, by the server in the first substation, of the message with the publisher encryption random number being done using a symmetric lightweight encryption algorithm.

8. The method according to claim 1, the SGS periodically changing the random seed number.

9. The method according to claim 8, the SGS periodically changing the random seed number at a regular interval such that there is a predetermined amount of time between each change of the random seed number, the predetermined amount of time being in a range of from 3 milliseconds (ms) to 8 weeks.

10. The method according to claim 9, the predetermined amount of time being in a range of from 3 ms to 100 ms.

11. The method according to claim 9, the predetermined amount of time being in a range of from 1 week to 8 weeks.

12. A method of securing data transfer over a wide area network (WAN) in a smart power system using a data distribution service (DDS), the method comprising:
   providing a seed generator server (SGS);
   providing a first substation comprising a publisher intelligent electronic device (TED) having a first random number generator (RNG) and being in operable communication with the SGS;
   providing a second substation comprising a subscriber TED having a second RNG and being in operable communication with the SGS;
   creating a secure channel for synchronized seed distribution by using a local shared certificate authority and permission certificate authority, along with a public key and a private key, for each of the first substation and the second substation;

generating, by the SGS, a random seed number and transferring the random seed number to the publisher IED and the subscriber IED using the secure channel;

synchronizing the first RNG and the second RNG using the secure channel;

generating a publisher sequence hopping number, by the first RNG, based on the random seed number;

generating a publisher encryption random number, by the first RNG, based on the random seed number;

generating a subscriber sequence hopping number, by the second RNG, based on the random seed number;

generating a subscriber decryption random number, by the second RNG, based on the random seed number;

attaching, by the publisher TED, the publisher sequence hopping number to a generic object oriented substation event (GOOSE) message to be routed through the WAN;

publishing, by the publisher TED, the GOOSE message to a local area network (LAN) of the first substation;

subscribing, by a server in the first substation, the GOOSE message with the attached publisher sequence hopping number;

signing, by the server in the first substation, the GOOSE message with the publisher encryption random number;

converting, by the server in the first substation, the GOOSE message to a DDS message;

publishing, by the server in the first substation, the DDS message to a pre-defined topic in the LAN of the first substation;

routing, by a DDS routing service, the DDS message over the WAN to the second substation;

performing the following steps a) through e) to verify the DDS message:
  a) decrypting, by a server in the second substation, the received DDS message using the subscriber decryption random number;
  b) if the decryption is successful, converting, by the server in the second substation, the received DDS message to a received GOOSE message and publishing the received GOOSE message in the LAN such that it is received by the subscriber IED;
  c) comparing, by the subscriber IED, the publisher sequence hopping number to the subscriber sequence hopping number attached to the received GOOSE message;
  d) accepting, by the subscriber IED, the received GOOSE message if the publisher sequence hopping number is the same as the subscriber sequence hopping number, and reacting to the received GOOSE message accordingly; and
  e) discarding, by the subscriber IED, the received GOOSE message if the publisher sequence hopping number is not the same as the subscriber sequence hopping number, such that the subscriber IED does not react to the received GOOSE message.

13. The method according to claim 12, the GOOSE message being a routable GOOSE (R-GOOSE) message.

14. The method according to claim 12, the secure channel being created using an asymmetric encryption algorithm.

15. The method according to claim 12, the generating of the publisher sequence hopping number, by the first RNG, being done using a first pseudo RNG (PRNG) algorithm, the generating of the publisher encryption random number, by the first RNG, being done using the first PRNG algorithm, the generating of the subscriber sequence hopping number, by the second RNG, being done using a second PRNG algorithm, and the generating of the subscriber decryption random number, by the second RNG, being done using the second PRNG algorithm.

16. The method according to claim 12, where, if the decryption is unsuccessful in step b), the subscriber IED generates a next pair of random numbers and the decryption is tried again and, if decryption is still unsuccessful after a plurality of such additional decryption attempts, a signal is sent to the SGS to request that it generates a new random seed number.

17. The method according to claim 12, the signing, by the server in the first substation, of the GOOSE message with the publisher encryption random number being done using a light encryption algorithm.

18. The method according to claim 12, the SGS periodically changing the random seed number.

19. The method according to claim 18, the SGS periodically changing the random seed number at a regular interval such that there is a predetermined amount of time between each change of the random seed number, the predetermined amount of time being in a range of from 3 milliseconds (ms) to 8 weeks.

20. A method of securing data transfer over a wide area network (WAN) in a smart power system, the method comprising:

providing a seed generator server (SGS);

providing a publisher intelligent electronic device (IED) having a first random number generator (RNG) and being in operable communication with the SGS;

providing a subscriber TED having a second RNG and being in operable communication with the SGS;

generating, by the SGS, a random seed number and transferring the random seed number to the publisher IED and the subscriber IED using an encrypted channel;

synchronizing the first RNG and the second RNG using the encrypted channel;

generating a publisher sequence hopping number, by the first RNG, based on the random seed number;

generating a publisher encryption random number, by the first RNG, based on the random seed number;

generating a subscriber sequence hopping number, by the second RNG, based on the random seed number;

generating a subscriber decryption random number, by the second RNG, based on the random seed number;

attaching, by the publisher IED, the publisher sequence hopping number to a message to be routed through the WAN;

publishing, by the publisher IED, the message to a local area network (LAN) of a first substation with which the publisher IED is in operable communication;

signing, by a server in the first substation, the message with the publisher encryption random number;

transferring the message from the server in the first substation through a communication channel and routing the message to a second substation with which the subscriber TED is in operable communication;

receiving, by a server in the second substation, the message; and performing the following steps a) through e) to verify the message:

a) decrypting, by the server in the second substation, the message using the subscriber decryption random number;
b) if the decryption is successful, publishing the received message to a LAN of the second substation;
c) comparing, by the subscriber TED, the subscriber sequence hopping number to the publisher sequence hopping number attached to the received message;
d) accepting, by the subscriber TED, the received message if the publisher sequence hopping number is the same as the subscriber sequence hopping number, and reacting to the received message accordingly; and
e) discarding, by the subscriber TED, the received message if the publisher sequence hopping number is not the same as the subscriber sequence hopping number, such that the subscriber TED does not react to the received message, the message being a routable generic object oriented substation event (R-GOOSE) message,
the encrypted channel being a secure socket layer (SSL) channel,
the generating of the publisher sequence hopping number, by the first RNG, being done using a first pseudo RNG (PRNG) algorithm,
the generating of the publisher encryption random number, by the first RNG, being done using the first PRNG algorithm,
the generating of the subscriber sequence hopping number, by the second RNG, being done using a second PRNG algorithm,
the generating of the subscriber decryption random number, by the second RNG, being done using the second PRNG algorithm,
the signing, by the server in the first substation, of the message with the publisher encryption random number being done using a symmetric lightweight encryption algorithm,
the SGS periodically changing the random seed number at a regular interval such that there is a predetermined amount of time between each change of the random seed number, the predetermined amount of time being in a range of from 3 milliseconds (ms) to 8 weeks, and
where, if the decryption is unsuccessful in step b), the subscriber IED generates a next pair of random numbers and the decryption is tried again and, if decryption is still unsuccessful after a plurality of such additional decryption attempts, a signal is sent to the SGS to request that it generates a new random seed number.

\* \* \* \* \*

UNITED STATES PATENT AND TRADEMARK OFFICE
CERTIFICATE OF CORRECTION

PATENT NO. : 10,499,242 B1
APPLICATION NO. : 16/422461
DATED : December 3, 2019
INVENTOR(S) : Mohammad Mahmoudian Esfahani, Tarek Youssef and Osama A. Mohammed Page 1 of 1

It is certified that error appears in the above-identified patent and that said Letters Patent is hereby corrected as shown below:

In the Specification

Column 1, Line 5 Insert:
--GOVERNMENT SUPPORT
This invention was made with government support under Grant Number DE-OE0000779 awarded by the Department of Energy. The government has certain rights in the invention.--

Signed and Sealed this
Nineteenth Day of May, 2020

Andrei Iancu
*Director of the United States Patent and Trademark Office*